(12) United States Patent
Jallouli et al.

(10) Patent No.: US 7,727,581 B2
(45) Date of Patent: Jun. 1, 2010

(54) PROCESS FOR APPLYING A COATING ON AN OPTICAL LENS FACE AND IMPLEMENTATION SYSTEM

(75) Inventors: Agnès Jallouli, Largo, FL (US); Gerald Fournand, Tampa, FL (US); James A. Reed, Clearwater, FL (US); Danne Wright, Saint Petersburg, FL (US)

(73) Assignee: Essilor International Compagnie Generale d' Optique, Charenton-Le-Pont (FR)

( * ) Notice: Subject to any disclaimer, the term of this patent is extended or adjusted under 35 U.S.C. 154(b) by 1527 days.

(21) Appl. No.: 10/802,172

(22) Filed: Mar. 17, 2004

(65) Prior Publication Data

US 2005/0208212 A1    Sep. 22, 2005

(51) Int. Cl.
*B05D 5/06* (2006.01)
(52) U.S. Cl. .......................... 427/162; 118/503; 359/819
(58) Field of Classification Search ................. 427/169, 427/166, 165, 162; 118/503, 500; 359/819
See application file for complete search history.

(56) References Cited

U.S. PATENT DOCUMENTS

| | | | |
|---|---|---|---|
| 3,226,245 A * | 12/1965 | Dettling et al. ............. | 427/185 |
| 4,436,764 A | 3/1984 | Nakazima et al. .......... | 427/54.1 |
| 4,643,128 A * | 2/1987 | Bracher et al. .............. | 118/503 |
| 5,446,596 A * | 8/1995 | Mostrorocco ............... | 359/827 |
| 5,968,377 A * | 10/1999 | Yuasa et al. ............ | 219/121.41 |
| 6,610,350 B2 * | 8/2003 | Suzuki et al. .............. | 427/2.24 |
| 6,752,911 B2 * | 6/2004 | Jung ..................... | 204/192.12 |
| 6,909,588 B2 * | 6/2005 | Moffatt ...................... | 361/234 |
| 2002/0086532 A1 * | 7/2002 | Hopfner ..................... | 438/689 |
| 2003/0008063 A1 | 1/2003 | Chabrecek et al. .......... | 427/2.1 |
| 2003/0138565 A1 | 7/2003 | Lewis ....................... | 427/372.2 |

FOREIGN PATENT DOCUMENTS

WO    WO 01/94103    12/2001

OTHER PUBLICATIONS

Portions of BPI Online Catalog, http://www.callbpi.com/; Aug. 24, 2004.

* cited by examiner

*Primary Examiner*—Timothy H Meeks
*Assistant Examiner*—Elizabeth Burkhart
(74) *Attorney, Agent, or Firm*—Fulbright & Jaworski L.L.P.

(57) ABSTRACT

A process is provided where at least one main face of an optical lens is subjected to a corona discharge or atmospheric plasma treatment. The optical lens is dipped in a curable coating composition to deposit a layer of the curable coating composition on said main face, and is then cured. During the whole process, the optical lens is carried by a same lens holder so that the lens face is freely accessible and without necessitating manual handling of the lens.

52 Claims, 4 Drawing Sheets

PROCESS FOR APPLYING A COATING ON AN OPTICAL LENS FACE AND IMPLEMENTATION SYSTEM

FIELD OF THE INVENTION

The present invention concerns in general a process for applying a coating on at least one main face of at least one optical lens which does not necessitate any manual handling of the optical lens during the whole coating process steps.

BACKGROUND OF THE INVENTION

Optical lenses, in particular ophthalmic lenses, whether made of mineral glass or organic glass, commercially available are commonly provided with one or more property enhancing coatings on one or both of their main faces for improving mechanical and/or optical properties of the final lens. Typically, those coatings are used for improving the adhesion of another coating to the lens, improving the impact resistance and/or the scratch resistance of the lens, imparting antireflective or anti-soil/anti-smudge or anti-fog properties to the lens.

It is also common to subject a lens face, uncoated or coated, to a corona discharge or atmospheric plasma treatment prior to the deposition of a further coating composition in order to improve adhesion of the coating on the lens main face or the surface of the previously deposited property enhancing coating.

In certain circumstances, corona discharge treatment or atmospheric plasma treatment is used to eliminate an outer coating, in particular an outer temporary coating, deposited on one or both main faces of an optical lens prior to applying a novel outer coating, generally having different properties than the eliminated coating, on the lens main faces. This is the case when an outer temporary coating is used for improving adhesion of the lens to the maintaining pad during an edging operation of the optical lens.

Typically, for the corona discharge treatment and atmospheric plasma treatment, the lens is just placed flat on a belt or a similar device with the surface to be treated freely accessible for the intended treatment.

Thus, the operator must manually turn the lens if both faces have to be treated by corona discharge or atmospheric plasma and manually placed the lens in a lens holder after the corona discharge or atmospheric plasma treatment for the subsequent coating deposition steps, for example a dip coating step and a curing step.

SUMMARY OF THE INVENTION

Thus, an object of the invention is to provide a lens coating process comprising the steps of treating at least one main face of a lens with corona discharge or atmospheric plasma, depositing on said at least one main face a layer of a curable coating composition and curing the deposited layer, in which all three steps are implemented using a same lens holder carrying the lens so that at least one main face of the lens is freely accessible and without necessitating manual handling of the lens.

A further object of the invention is to provide a system for implementation of the above process.

According to the invention, there is provided a process for applying a coating on at least one main face of at least one optical lens which comprises the steps of:
(a) subjecting said at least one main face to a corona discharge or atmospheric plasma treatment;
(b) dipping the optical lens in a curable coating composition to deposit a layer of the curable coating composition on said at least one main face of the optical lens; and
(c) curing the layer of curable coating composition to obtain a coated lens;
wherein during the whole process the optical lens is carried by a same lens holder so that said at least one main face is freely accessible and without necessitating manual handling of the lens.

Preferably, the lens is carried in the lens holder so that both main faces of the lens are freely accessible.

The lens will usually be carried by the lens holder by its periphery, and preferably through two or four contact points between the lens periphery and the lens holder.

A suitable optical lens holder for carrying at least one optical lens during lens treatments according to the process comprises a supporting means and a first and a second arm defining a lens holder general plane, first and second arms being relatively movable with regards to each other and each arm having spaced apart first and second end portions, and an intermediate portion, the arms being mounted on the supporting means through their first end portions and the second end portions of each arm comprising an optical lens accommodating means, said lens accommodating means facing each other, whereby an optical lens can be maintained within the accommodating means of the first and second arms with its optical axis orthogonal or nearly orthogonal to the general plane of the lens holder through at least one, preferably one or two contact points between the lens periphery and each of the first and second lens accommodating means.

In an other embodiment of the lens holder, the second end portion of the second arm is provided with an additional lens accommodating means opposite to the lens accommodating means of the second arm facing the lens accommodating means of the first arm, and a third arm is provided opposite to the first arm and lying in the lens holder general plane, relatively movable with regard to the second arm and having spaced apart first and second end portions and an intermediate portion, the third arm being mounted on the supporting means through its first end portion and the second end portion of the third arm being provided with a lens accommodating means facing the additional lens accommodating means of the second arm, whereby an additional lens can be maintained within the lens accommodating means of the third arm and the additional accommodating means of the second arm with its optical axis orthogonal or nearly orthogonal to the general plane of the lens holder through at least one, preferably one or two contact points between its periphery and each of the additional lens accommodating means of the second arm and of the third arm.

Preferably, at least the second end portion of each arm comprises a material having a dielectric constant at 1 MHz equal to or higher than the dielectric constant of the optical lens material.

Preferably, the material of the second end portions of the arms has a dielectric constant at 1 MHz of 3.0 or more.

Furthermore, the material of the second end portions of the arms preferably also has a specific heat (kJ kg$^{-1}$ K$^{-1}$) higher than the specific heat of the optical lens material to be held in the holder and more preferably have a specific heat higher than 1.2. kJ kg$^{-1}$ K$^{-1}$.

In one embodiment, the material of the second end portions of the arms is selected from plastic materials and in particular plastic materials selected from the group consisting of poly-acrylonitrile-butadiene-styrene (ABS), polyoxymethylene homo and copolymers (POMH and POMC), cellulose acetate (CA), cellulose acetate butyrate (CAB), polyamides, polyetherimides (PEI), polyalkylmethacrylates such as polymethylmethacrylates (PMMA) and polyaramides.

Although only the second end portions of the arms may be made of the material having the required dielectric constant value, the entire arm can be made of this material.

Alternatively, the second end portions of the arms can be made of an electrically conductive material or is covered with an electrically conductive material such as a metal.

Suitable metals are stainless steel, aluminum, copper, brass and gold.

Preferred metals are aluminium, stainless steel.

When the second end portion is made of a metal such as aluminium, the remaining portion of the arm is preferably made of an electrically insulating material. Appropriate electrically insulating material can be any classical electrically insulating material including the plastic materials recited above.

Among the preferred electrically insulating plastic material, there may be cited polyoxymethylene homo and copolymer, polyacrylonitrile butadiene styrene.

Applicant has established that the use of a metal or a metallic coating for the second end portions of the arms of the lens holder of the invention avoids any localized overheating, in particular when using low speed of passage in a corona discharge device, such as 3.6 mm/s or less.

If one covers the second end portions of the arms with an aluminum foil, the thickness of the aluminum foil is ranging from 0.00017 inches to 0.0059 inches (i.e. 0.0043 mm to 0.15 mm).

Other coatings for the second end portions are those comprising electroconductive polymers, preferably having a conductivity better than polycarbonate.

The supporting means is not electrically conductive.

When a lens is placed in the lens holder, at least one of the faces of the lens is freely accessible for a corona discharge treatment, preferably both faces of the lens are freely accessible for a simultaneous corona treatment.

In order to further improve heat evacuation, specific designs of the lens accommodating means have been established.

In one embodiment, the lens accommodating means are in the form of recesses managed in the second end portions of the arms. Preferably, the recesses have a flat bottom wall and two inclined sidewalls, the angle of the sidewalls with the bottom wall being such that a lens placed in the holder will be maintained either through only two contact points with the bottom wall or four contact points with the sidewalls and that there is no areas created between the lens periphery and the holder in which for example the electrical arc carried by an air flow coming out from corona heads will get trapped, creating areas of overheating. Preferably, the angle between the lateral sides and the bottom of the recesses is 120° or more.

Preferably also, the thickness of the arms and in particular of the second end portions shall be as low as possible.

Typically, the second end portions of the arms are thinner than the remaining portions of the arms and have a thickness ranging from 2 mm to less than 13 mm, preferably 2 to 10 mm. Thus, the arms can absorb the heat of the lens faster and also dissipate faster the heat through air exchange.

In an other embodiment, the lens accommodating means of each arm are in the form of two identical spaced apart tabs projecting perpendicularly from facing surfaces of the first and second arms and having a lens receiving notch at their free ends. Preferably, the notches have a V shape with an angle of 90° C. or more. In this embodiment, the lens is maintained in the lens holder through four contact points between its periphery and the surfaces of the notches of the tabs. In this latter embodiment, the arms or only the tabs may be elastically deformable to allow accomodation of the lens.

The system for implementing the process of the invention comprises a corona discharge or atmospheric plasma treatment device, a dip coating device containing a curable coating composition, a curing device, a lens holder transportation means and a lens holder carrying a lens so that at least one main face of the lens is freely accessible, said lens holder transportation means comprising means for bringing successively the lens holder above each of the devices and means to move the lens holder to bring the carried lens in an operating position within each of the devices and withdrawn the lens from the operating position, whereby the whole process is effected without necessitating any manual handling of the lens.

As indicated previously, the first step of the process of the invention is a corona discharge treatment or an atmospheric plasma treatment, preferably a corona discharge treatment.

The preferred atmospheric pressure plasma treatment is an oxygen plasma treatment.

Typically, the power of the corona discharge treatment ranges from $10^2$ to $2.10^3$ W, preferably $5.10^2$ to $10^3$ W. Lower frequencies are preferred for reasons of safety, although higher frequencies, e.g. 2000 Hz, will provide good results.

For example, the corona discharge treatment may be effected using a corona discharge unit form 3DT, model Multidyne 800W with a discharge of 12 KV per electrode.

Preferably, the corona discharge unit comprises two corona heads oriented towards each other, but preferably not in register to avoid electric arc between the heads. With such a corona discharge unit the two main faces of the optical lens can be treated almost simultaneously.

In the corona discharge treatment, the lens is preferably moved in face of the corona head or heads several times with a pause of several seconds between each passage in face of the head or heads to avoid overheating of the lens.

Preferably, the duration of the corona discharge or atmospheric plasma treatment, i.e. the total time during which each point of the main face of the lens is subjected to the corona discharge or atmospheric plasma, is 1 minute or less.

The process of the invention can be used to apply a coating on at least one main face of a lens made of mineral glass or organic glass, preferably organic glass, the main face of the lens being uncoated or coated with one or more property enhancing coating such as an adhesion primer coating, an impact resistant and/or scratch resistant coating, an anti-reflective coating or a hydrophobic and/or oleophobic top coat.

The treated lenses may have different sizes and shapes. In particular, the treated lens may have been submitted to an edging step in order to conform it to the shape of a spectacle frame.

The dip coating step of the invention can be implemented with any kind of curable coating composition, for example a hard coat composition, but preferably, a hydrophobic and/or oleophobic top coat.

The preferred hydrophobic and/or oleophobic topcoat is made from a curable composition comprising at least one fluorinated compound.

Preferred fluoro compounds are silanes and silazanes bearing at least one group selected from fluorocarbons, polyfluorocarbons, fluoropolyethers and polyfluoropolyethers, in particular perfluoropolyethers.

Fluorocompounds are disclosed, among others, in U.S. Pat. No. 4,410,563, EP-0 203 730, EP-749 021, EP-844 265 and EP-933 377.

Among fluorosilanes there may be cited the compounds of formulas:

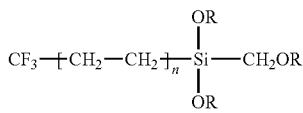

n=5, 7, 9 or 11 and R is an alkyl radical, typically a $C_1$-$C_{10}$ alkyl radical such as —$CH_3$, —$C_2H_5$ and —$C_3H_7$;

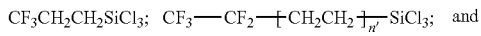
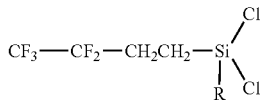

n' = 7 or 9 and R is as defined above.

Compositions containing fluoro compounds also useful for making the top coat are disclosed in U.S. Pat. No. 6,183,872.

The silicon-containing organic fluoropolymer of U.S. Pat. No. 6,183,872 is represented by the general formula and has a number average molecular weight of from $5 \times 10^2$ to $1 \times 10^5$.

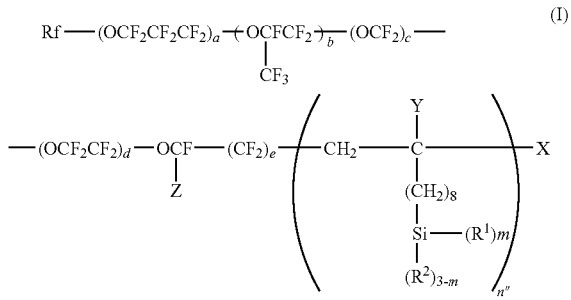

wherein Rf represents perfluoroalkyl; Z represents fluoro or trifluoromethyl; a, b, c, d and e each independently represent 0 or an integer of 1 or above, provided that a+b+c+d+e is not less than 1 and the order of the repeating units parenthesized by subscripts a, b, c, d and e occuring in the formula is not limited to that shown; Y represents hydrogen or alkyl containing 1 to 4 carbon atoms; X represents hydrogen, bromo or iodo; $R^1$ represents hydroxy or a hydrolyzable substituent group; $R^2$ represents hydrogen or a monovalent hydrocarbon group; l represents 0, 1 or 2; m represents 1, 2 or 3; and n" represents an integer of 1 or above, preferably 2 or above.

An other class of preferred compositions for forming the initial top coat are those containing fluoropolyether groups, in particular polyfluoropolyether groups and in particular perfluoropolyether groups. A particular preferred class of compositions containing fluoropolyether groups is disclosed in U.S. Pat. No. 6,277,485.

The anti-soiling top coats of U.S. Pat. No. 6,277,485 are at least partially cured coatings comprising a fluorinated siloxane prepared by applying a coating composition (typically in the form of a solution) comprising at least one fluorinated silane of the following formula:

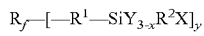

wherein: $R_f$ is a monovalent or divalent polyfluoropolyether group, $R^1$ is a divalent alkylene group, arylene group, or combinations thereof, optionally containing one or more heteroatoms or functional groups and optionally substituted with halids, and preferably containing 2 to 16 carbon atoms; $R^2$ is a lower alkyl group (i.e., a($C_1$-$C_4$) alkyl group); Y is a halid, a lower alkoxy group (i.e., a($C_1$-$C_4$) alkoxy group, preferably, a methoxy or ethoxy group), or a lower acyloxy group (i.e., —OC(O)$R^3$ wherein $R^3$ is a ($C_1$-$C_4$) alkyl group); x is 0 or 1; and y is 1 ($R_f$ is monovalent) or 2 ($R_f$ is divalent). Suitable compounds typically have a molecular weight (number average) of at least about 1000. Preferably, Y is a lower alkoxy group and $R_f$ is a perfluoropolyether group.

A commercial composition for making the top coat is the composition KP 801M commercialized by SHINETSU, OF 110 commercialized by OPTRON or OPTOOL DSX commercialized by DAIKIN.

Generally, the top coat has a thickness ranging from 1 to 100 nm, preferably 1 to 60 nm, more preferably 1 to 5 nm.

The hydrophobic and/or oleophobic top coat is preferably deposited in excess during the dip coating step, i.e. with a higher thickness of curable top coat composition than required for the cured final coating is deposited on the lens main face or faces and, after curing, the lens is treated to eliminate excess of top coat. Preferably, this excess is eliminated by wiping with a cloth. This elimination should preferably be done shortly after the end of the curing step, i.e. within 15 minutes. As just after curing some optical defects may be present on the lens top coat such as, for example, unevenness, the elimination of the excess of top coat renders optical quality to the top coat.

Preferably, the curable coating composition has a solid content less than 5% by weight, preferably less than 1% by weight and even better between 0.5% and 0.05% by weight based on the total weight of the curable composition.

The curing step will depend on the kind of curable coating composition used in the process and can be any classical curing step such as a thermal curing step for example an infra-red (IR) curing or an oven curing, a photocuring step for example a UV-curing or a combination of thermal curing and photocuring.

Preferably the curing step is an IR curing step.

In a preferred implementation of the process of the invention, the corona discharge or atmospheric plasma step is used to eliminate a temporary outer coating deposited on the lens face or faces prior to dip coat the main face or faces with a new coating, preferably a final hydrophobic and/or oleophobic top coat.

DETAILED DESCRIPTION OF THE INVENTION AND PREFERRED EMBODIMENTS

Figure 1:
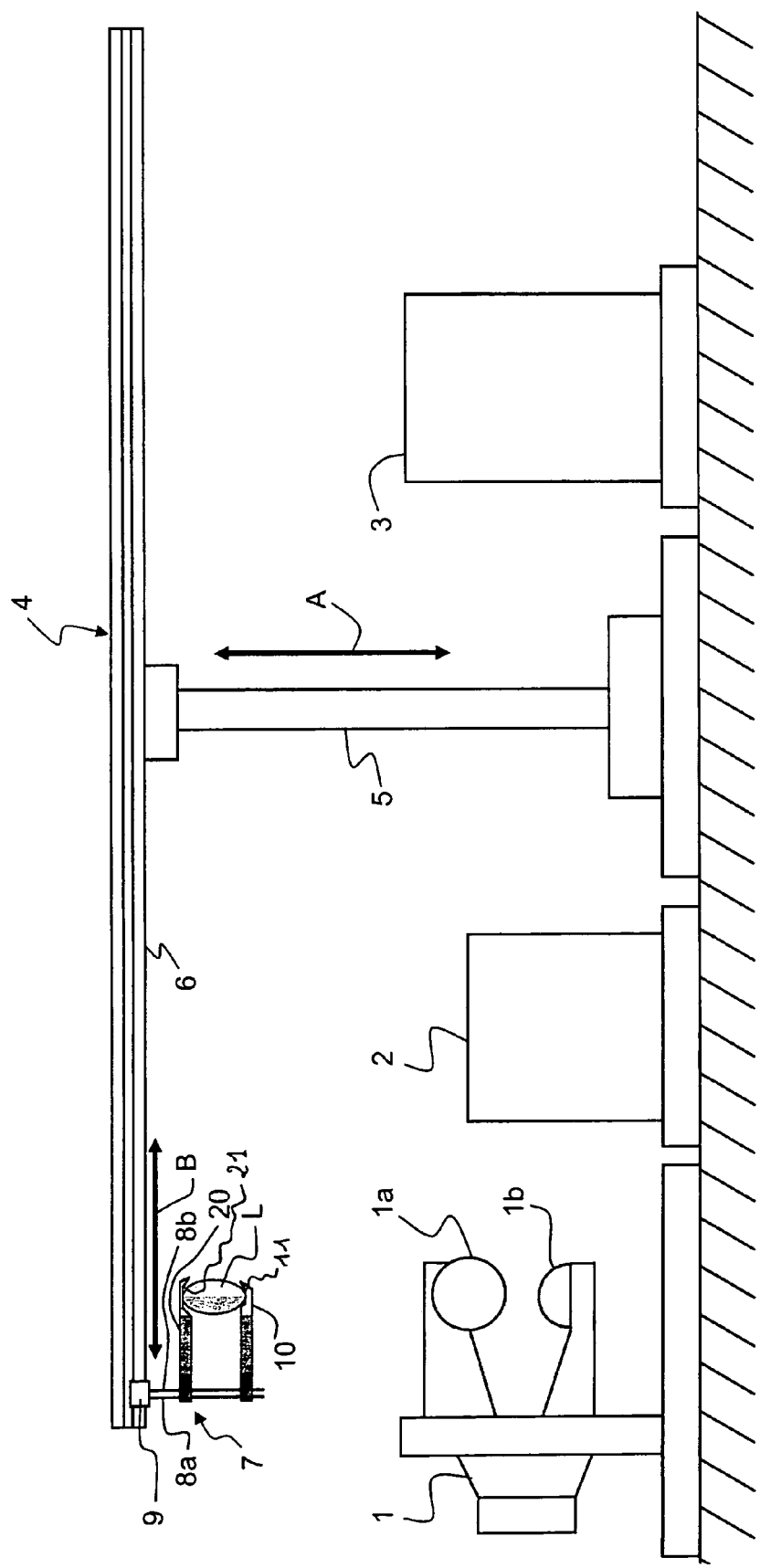
FIG. 1, is a schematic representation of a system for implementing the coating process of the invention.

Referring to FIG. 1, there is shown schematically a system for implementing the coating process of the invention.

The system represented in FIG. 1 comprises, in a successive arrangement, a corona discharge device 1, a dip coating tank 2 containing a curable coating composition and a curing device 3, for example an IR curing device.

The system also comprises a lens holder transportation fixture 4 having a T shape. Transportation fixture 4 comprises a vertical slide 5 on which is slidably mounted a transversal horizontal slide 6. A lens holder 7 is slidably mounted on transversal horizontal slide 6. Transversal horizontal slide can be slidably translated down and up on vertical slide 5 as shown by arrows A whereas lens holder 7 can be slidably translated from one end to the other of transversal horizontal slide 6 and vice versa, as shown by arrows B.

The transportation fixture 4 is disposed in the system so that transversal horizontal slide 6 extends above corona discharge device 1, dip coating tank (2) and curing device (3) and allows freely moving lens holder 7 above the same when the transversal horizontal slide 6 is in its upper position on vertical slide 5.

Lens holder 7 comprises two horizontal arms 10, 20 mounted through a first end portion thereof, relatively movable with regard to each other, on a pair of parallel vertical rails 8a, 8b. The pair of rails is linked through one of their ends to a cursor 9 slidably engaged with transversal horizontal slide 6.

A second end portion of each arm 10, 20, opposite to the first end portions, is provided with a lens accommodating means 11, 21, in which an optical lens L can be carried by its periphery through 2 or 4 contact points with the lens accommodating means, thus leaving both main faces of lens L freely accessible.

The lens accommodating means can be recesses or notched tabs as described below in connection with FIGS. 2 and 3.

Although in FIG. 1, the pair of vertical rails 8a, 8b supporting the arms is directly connected with cursor 9, so that arms 10, 20 are held horizontally, the pair of rails 8a, 8b may be connected to cursor 9 horizontally and the arms 10, 20 will then be held vertically.

Of course, rails 8a, 8b may not be directly linked to cursor 9 but through an appropriate separate mounting device, in particular a pivoting device (not represented). This separate mounting device may also be linked to one of the arms or to a specific part fixed to one of the rails or the arms.

In FIG. 1, the corona discharge device 1 comprises two corona heads 1a, 1b directed towards each other but not in register.

Using the system of FIG. 1, the coating process of the invention is as follows:

With transversal horizontal slide 6 at the upper end of vertical slide 5, lens holder 7 carrying lens L is moved along slide 6 to a position directly above the corona heads 1a, 1b of corona discharge device 1. Then horizontal slide is moved down so that lens L is passed between corona heads 1a, 1b for corona discharge treatment. Then, horizontal slide is moved up and down to effect several passages of the lens in front of the corona heads, with preferably a pause between the passages, to complete the treatment. With the system of FIG. 1, both main faces of the lens L are corona discharge treated almost simultaneously, due to the use of the two corona heads.

If only one corona head is used, then using a pivoting mount for the lens holder will allow successive corona treatments of each main face of the lens L by rotation of 180° of the lens holder after completion of the treatment of a first face.

Once the corona treatment has been completed, horizontal slide 6 is moved up to the upper end of vertical slide 5 and lens holder 7 is slidably translated directly above dip coating tank 2. Then horizontal slide 6 is moved down to dip lens L in the dip coating composition.

After completion of the dip coating step, horizontal slide 6 is moved up and lens holder 7 is translated directly above curing device 3 where horizontal slide 6 is moved down to place lens L in curing device 3. After completion of the curing step, horizontal slide 6 is moved up to withdraw the lens holder 7 with lens L from the curing device and the final treated lens can then be recuperated.

Of course, although the horizontal slide 6 and lens holder 7 can be manually moved, by an operator, they are preferably moved through automatic means such as well know electromechanical actuators. Preferably also, the all process may be controlled through a programmed central unit.

Clearly, the system allows the whole process to be performed without any manual handling of the lens to be treated.

Although the above description has been made in relation with a straight linear arrangement of treating devices and a linear displacement of the lens holders from one device to another, other arrangements may be used. For example, the lens holders may be mounted on a carrousel and the treating devices arranged in a circular configuration, whereby the lens holders are brought to each of the treating devices through rotation.

Figure 2:
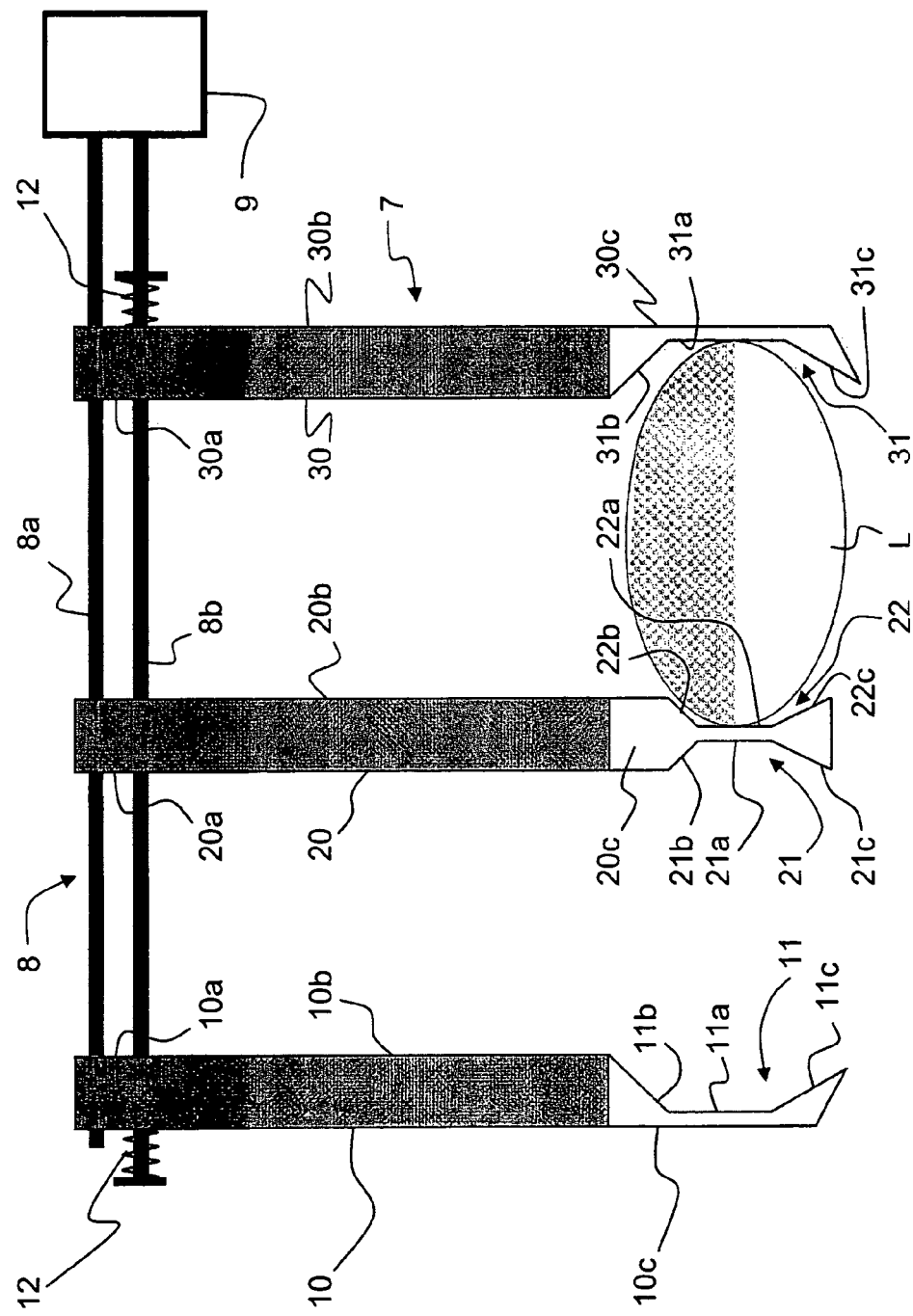
FIG. 2 is a schematic front view of a second embodiment of an optical lens holder suitable for use in the process of the invention.

Referring to FIG. 2, there is shown a second embodiment of an optical lens holder 7 according to the invention. The holder 7 comprises a supporting means 8 in the form of a pair of parallel rails 8a, 8b and three arms 10, 20, 30, namely a central arm 20 and two lateral arms 10, 30 on both sides of the central arm 20.

Each arm 10, 20, 30 comprises a first end portion 10a, 20a, 30a and a second end portion 10c, 20c, 30c and an intermediate portion 10b, 20b, 30b.

The arms 10, 20, 30 are mounted through their first ends 10a, 20a, 30a to the supporting rails 8a, 8b in a spaced a part relationship, thus defining a general plane of the holder, i.e. the plane of the drawing sheet.

As shown, rails 8a, 8b are connected to a cursor 9.

In the embodiment of FIG. 2, central arm 20 is fixedly mounted on the rails 8a, 8b whereas both lateral arms 10, 30 are slidably mounted on rails 8a, 8b.

For example, as shown on FIG. 1, each of the lateral arms 10, 30 can be biased by a compression spring 12 mounted on rail 8b.

Thus, springs 12 urge lateral arms 10, 30 towards central arm 20 to a final position for firmly maintaining an inserted lens L.

Of course, lateral arms 10, 30 may simply be sliding on rails 8a, 8b and blocking means such as blocking screws may be provided to maintain the lateral arms at the desired position.

Second end portions 20c of central arm 20 comprises two opposite lens accommodating recesses 21, 22 and each lateral arm second end portion 10c, 30c comprises one lens accommodating recess 11, 31, each of the recesses 11, 31 of the second end portions 10c, 30c of lateral arms 10, 30 facing one corresponding recess 21, 22 of the central arm 20.

As seen in FIG. 2, each of the lens accommodating recesses comprises a flat bottom wall 11a, 21a, 22a, 31a and two inclined flat sidewalls 11b, 11c, 21b, 21c, 22b, 22c, 31b, 31c, respectively.

Preferably, the inclined flat sidewalls form with the flat bottom wall an angle of 120° or more.

Figure 3:
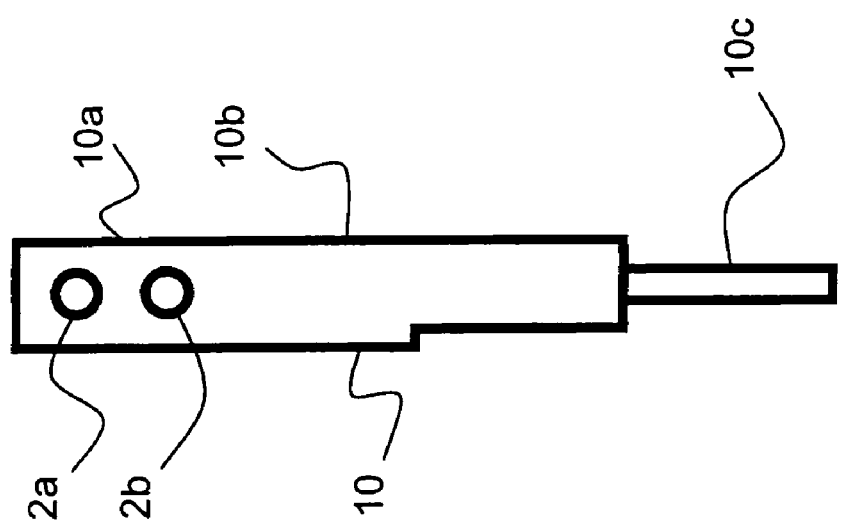
FIG. 3 is a side view of one arm of the lens holder of FIG. 1, showing the reduced thickness of the second end portion of the arm.

As shown on FIG. 3, the second end portion 10c of lateral arm 10 is thinner than the intermediate and first end portion 10b, 10a. Typically, the thickness of second end portion 10c in the direction perpendicular to the general plane of the holder is about 4 mm. Intermediate portion 10c has typically a thickness of 13 mm. Similarly, the second end portions 20c, 30c of central arm 20 and lateral arm 30 are thinner than their intermediate and first end portions, being typically of a thickness of 4 mm.

Preferably, at least the second end portions 10c, 20c, 30c and preferably the entire arms 10, 20, 30 are made of a material having a dielectric constant at 1 MHz of at least 3.0 and preferably also a specific heat higher than $1.2 \, kJ \, kg^{-1} K^{-1}$.

A preferred material is a polyoxymethylene commercialized under tradename DELRIN®.

The second end portions of the arms can also be made of a metal or coated with a metal such as aluminum. In that case, preferably, the other portions of the arms are made of an electrically insulating material, in particular a plastic material.

For placing a lens L in the holder 7, the user first moves, for example, lateral arm 30 away from central arm 20 by slidably translating arm 30 on rails 8a, 8b against spring 12. He then places the lens 30 with its optical axis orthogonal to the holder general plane in the created space between the facing recesses 22, 31 of central arm 20 and lateral arm 30. Once the lens L in the correct position, he liberates lateral arm 30 which under the action of spring 12 is urged towards central arm 20, into contact with the periphery of lens L, thereby firmly maintaining lens L in position. Depending on the shape of the recesses, the lens 3 is firmly maintained by central arm 20 and lateral arm 30 through 2 or 4 contact points between the lens periphery and the second end portions of the arms.

Lateral arm 10 functions in a similar way as lateral arm 30, thus permitting accomodation of a second lens in the holder.

Of course, the holder 7 may solely comprise two arms. In that case, one of the arm may be fixed and the other is movable or both arms can be movable.

Figure 6:
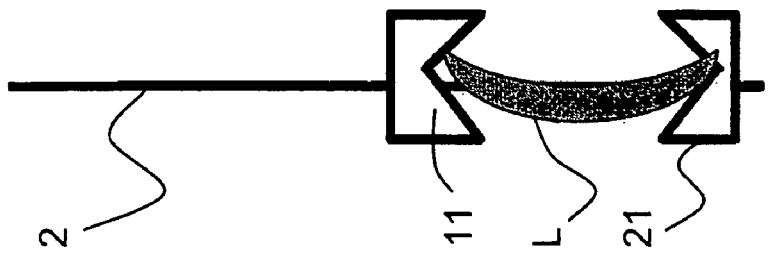
FIG. 6 is a schematic side view of the optical lens holder of FIG. 4.
Figure 5:
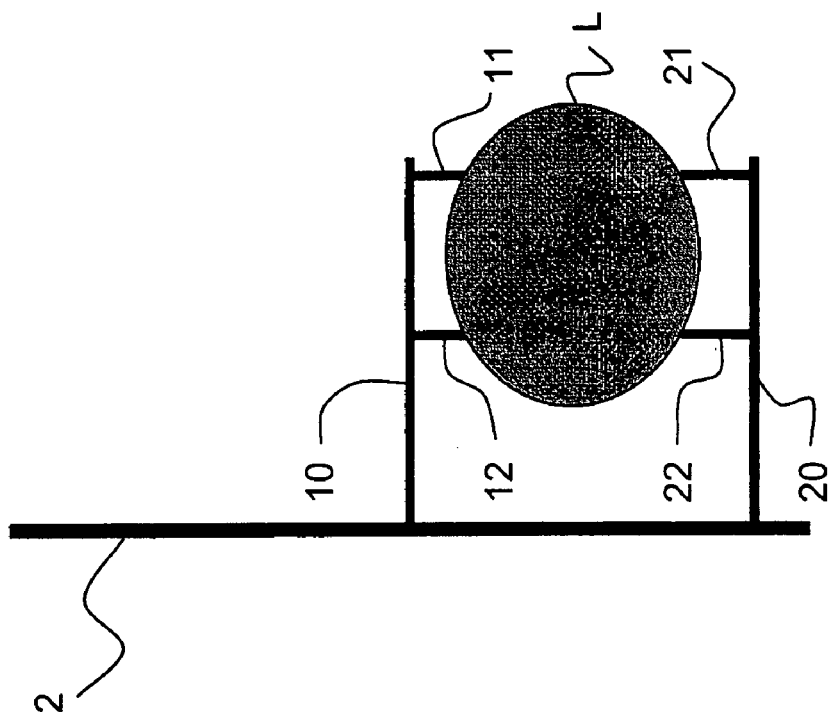
FIG. 5 is a schematic front view of the optical lens holder of FIG. 4.
Figure 4:
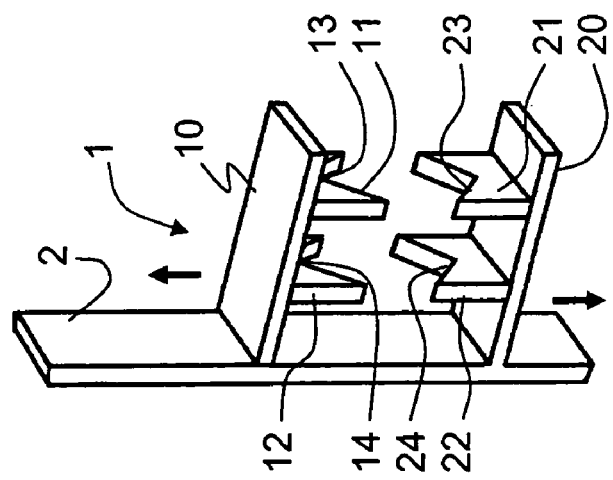
FIG. 4 is a schematic perspective view of a second embodiment of an optical lens holder according to the invention.

Referring to FIGS. 4 to 6, there is represented another embodiment of an optical lens holder according to the invention.

The lens holder comprises a supporting means such as an elongated plate 13 to be held vertically and two spaced apart arms 10, 20 projecting horizontally from one face of elongated plate 13. As shown in the drawings, the arms are also formed of two elongated plates. The mutually facing surfaces of the arms 10, 20 are each provided with two spaced apart tabs 11, 12; 21, 22, projecting perpendicularly from the surface of the arm.

The tabs on one of the arm surface are in register with the tabs of the facing surface of the other arm.

The free ends of each tab 11, 12; 21, 22 are provided with a notch 13, 14; 23, 24 preferably a notch having an angle of at least 90°.

As indicated earlier, the arms 10, 20 may be mounted on supporting means 13 by one end portion thereof through means (not represented) allowing relative slidable translation of the arms on the supporting means 13.

However, the arms 10, 20, the tabs 11, 12, 21, 23 and the supporting plate 13 may be a single molded piece, with either the arms or the tabs being elastically deformable.

Of course, as previously indicated, the tabs and also preferably the portion of the arms in the vicinity of the tabs shall be made of a material having the dielectric constant and also preferably the required specific heat.

Figure 7:
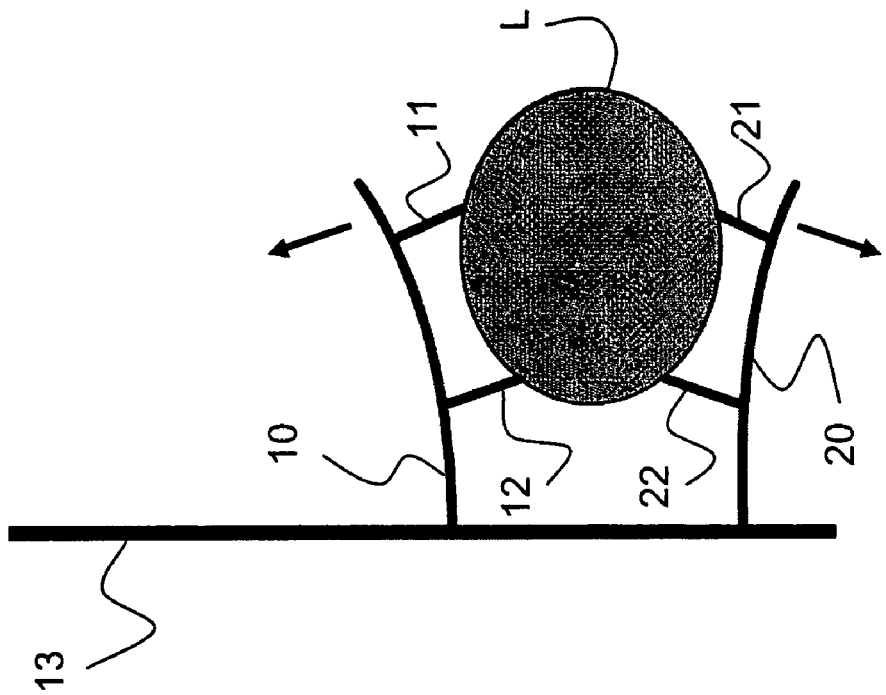
FIG. 7 is a schematic front view of an optical lens holder similar to the lens holder of FIG. 4 but with elastically deformable arms.

When a user wants to place an optical lens in this holder, he first moves away from each other the arms 10, 20 either by slidably translating them away from each other or by elastically deforming them away from each other as shown in FIG. 7. Then the user introduces the lens L in the accommodating space thus formed, with the lens optical axis perpendicular to the general plane of the lens holder, i.e. the plan of drawing sheet, and moves the arms towards each other or let them move to their initial relative position due to elastic forces of the arms so that the lens L is maintained in the holder through four (4) contact points between the lens periphery and the holder.

When only the tabs are elastically deformable, the user needs only to force lens L in position against the tabs which, due to their elasticity will accommodate the lens and maintain it.

EXAMPLE

ORMA® and AIR WEAR® CRIZAL® lenses from Essilor are edged to the desired shape with an edging machine.

Then said lenses are successively treated in the apparatus of FIG. 1.

The example is given for treatment of one lens.

Each lens is placed in the holder 7. In the first part of the treatment, the lens is moved at a speed of 17 mm/s in front of the two corona heads, one treating the front side and the other treating the back side.

Three other passes are made in front of the corona heads with a dwell time of 5 seconds between each pass.

After the corona treatment, the process is stopped for 10 seconds so that the lens can cool down.

Then the holder and the lens are moved by translation above a tank containing a coating solution containing a hydrophobic and oleophobic agent whose trade name is OPTOOL DSX in Demnum solvent, commercialized by DAIKIN. The solid content or dry extract of this coating solution is 0.1% by weight.

Then the lens is dip coated in said coating solution.

The speed of withdrawal of the lens is 22 mm/s.

When withdrawn from the bath, the lens on the holder is directly moved in an IR oven.

The curing cycle lasts around 30 seconds and consists in regularly increasing the temperature of the surface of the lens up to a maximum temperature of 30 to 50° C., reached at the end of the curing cycle.

Then the lens is removed from the machine and set down for 5 minutes.

The lens is further wiped with a cloth and a reflection free cleaning solution to remove any excess of coating.

The total process time from when the lens is put in the machine and the process is started till the process stops is of 3 minutes and 14 seconds for lenses bigger than 35 mm, with no handling during the process.

The invention claimed is:

1. A process for applying a coating on at least one main face of at least one optical lens which comprises:
    subjecting said at least one main face to a corona discharge or atmospheric plasma treatment;
    dipping the optical lens in a curable coating composition to deposit a layer of the curable coating composition on said at least one main face of the optical lens; and
    curing the layer of curable coating composition to obtain a coated lens;
    wherein the optical lens is carried by the same lens holder during said process such that both main faces of the optical lens are freely accessible, wherein the lens holder comprises a support and a first and a second arm defining a lens holder general plane, the first and second arms being relatively movable with regard to each other and each arm having spaced apart first and second end portions and an intermediate portion, the arms being mounted on the support through their first end portions and the second end portions of each arm being adapted to accommodate the optical lens during use, wherein the optical lens is held only by the second end portions of the first and second arms with its optical axis orthogonal to the general plane of the lens holder through one to two contact points between the lens periphery and each second end portions of the first and second arms.

2. The process of claim 1, wherein at least the second end portion of each arm comprises a material having a dielectric constant at 1 MHz equal to or higher than the dielectric constant of the optical lens material.

3. The process of claim 2, wherein the material of the second end portion of each arm has a dielectric constant at 1 MHz of 3.0 or more.

4. The process of claim 2, wherein the material of the second end portion of each arm has a specific heat (kJ kg$^{-1}$ K$^{-1}$) higher than the specific heat of the optical lens material.

5. The process of claim 4, wherein the material of the second end portion of each arm has a specific heat higher than 1.2 kJ kg$^{-1}$ K$^{-1}$.

6. The process of claim 2, wherein the second end portion of each arm is either made of or covered with an electrically conductive material.

7. The process of claim 6, wherein the electrically conductive material is a metal.

8. The process of claim 7, wherein the metal is aluminum, stainless steel, copper, brass, or gold.

9. The process of claim 6, wherein the intermediate portion and first end portion of the arms are made of an electrically insulating material.

10. The process of claim 2, wherein the second end portion of each arm is thinner than the intermediate and first end portions in a direction orthogonal to the general plane of the lens holder.

11. The process of claim 10, wherein the thickness of the second end portion of each arm ranges from 2 mm to less than 13 mm.

12. The process of claim 11, wherein the thickness of the second end portion of each arm ranges from 2 mm to 10 mm.

13. The process of claim 1, wherein each of the second end portion of each arm adapted to accommodate an optical lens during use comprises a recess having a bottom wall and two inclined sidewalls.

14. The process of claim 13, wherein the inclined sidewalls form an angle of at least 120° with the bottom wall.

15. The process of claim 1, wherein the support comprises a pair of parallel rails, first and second arms being movable by translation on said pair of rails, relatively to each other.

16. The process of claim 15, wherein each of the second end portion of each arm adapted to accommodate an optical lens during use lens comprises a recess having a bottom wall and two inclined sidewalls.

17. The process of claim 16, wherein the inclined sidewalls form an angle of at least 120° with the bottom wall.

18. The process of claim 1, wherein the second end portion of the second arm is provided with an additional portion adapted to accommodate an optical lens during use, and wherein said lens holder further comprises a third arm opposite to the first arm and lying in the lens holder general plane, relatively movable with regard to the second arm and having spaced apart first and second end portions and an intermediate portion, the third arm being mounted on the support through its first end portion and the second end portion of the third arm being provided with a portion adapted to accommodate an optical lens during use, whereby an additional lens can be maintained between the third arm and the second arm with its optical axis orthogonal to the general plane of the lens holder through one or two contact points between its periphery and each of the second arm and the third arm.

19. The process of claim 18, wherein at least the second end portion of the third arm comprises a material having a dielectric strength of 1 MHz equal to or higher than the dielectric constant of the optical lens material.

20. The process of claim 19, wherein the material of the second end portion of each arm has a dielectric constant at 1 MHz of 3.0 or more.

21. The process of claim 19, wherein the material of the second end portion of each arm has a specific heat (kJ kg$^{-1}$ K$^{-1}$) higher than the specific heat of the optical lens material.

22. The process of claim 19, wherein the material of the second end portion of each arm has a specific heat higher than 1.2 kJ kg$^{-1}$ K$^{-1}$.

23. The process of claim 19, wherein the second end portion of each arm is either made of or covered with an electrically conductive material.

24. The process of claim 23, wherein the electrically conductive material is a metal.

25. The process of claim 24, wherein the metal is aluminum, stainless steel, copper, brass, or gold.

26. The process of claim 23, wherein the intermediate portion and first end portion of the arms are made of an electrically insulating material.

27. The process of claim 18, wherein the second end portion of each arm is thinner than the intermediate and first end portions in a direction orthogonal to the general plane of the lens holder.

28. The process of claim 27, wherein the thickness of the second end portion of each arm ranges from 2 mm to less than 13 mm.

29. The process of claim 28, wherein the thickness of the second end portion of each arm ranges from 2 mm to 10 mm.

30. The process of claim 18, wherein the support comprises a pair of parallel rails, the first and third arms being movable by translation on said pair of rails.

31. The process of claim 1, wherein each of the second end portion of each arm adapted to accommodate an optical lens during use comprises two identical spaced apart tabs projecting perpendicularly from the first and second arms.

32. The process of claim 31, wherein each tab comprises a lens receiving notch at its free end.

33. The process of claim 32, wherein the notch has the shape of a V.

34. The process of claim 33, wherein the angle of the V notch is 90° or more.

35. The process of claim 31, wherein first and second arms are movable by translation on the support.

36. The process of claim 31, wherein first and second arms are elastically deformable.

37. The process of claim 31, wherein only the tabs are elastically deformable.

38. The process of claim 31, wherein the material of the second end portion of each arm has a dielectric constant at 1 MHz of 3.0 or more.

39. The process of claim 31, wherein the material of the second end portion of each arm has a specific heat (kJ kg$^{-1}$ K$^{-1}$) higher than the specific heat of the optical lens material.

40. The process of claim 39, wherein the material of the second end portion of each arm has a specific heat higher than 1.2 kJ kg$^{-1}$ K$^{-1}$.

41. The process of claim 31, wherein the second end portion of each arm is either made of or covered with an electrically conductive material.

42. The process of claim 41, wherein the electrically conductive material is a metal.

43. The process of claim 42, wherein the metal is aluminum, stainless steel, copper, brass, or gold.

44. The process of claim 41, wherein the intermediate portion and first end portion of the arms are made of an electrically insulating material.

45. The process of claim 31, wherein the second end portion of each arm is thinner than the intermediate and first end portions in a direction orthogonal to the general plane of the lens holder.

46. The process of claim 45, wherein the thickness of the second end portion of each arm ranges from 2 mm to less than 13 mm.

47. The process of claim 46, wherein the thickness of the second end portion of each arm ranges from 2 mm to 10 mm.

48. The process of claim 1, wherein treatment (a) is a corona discharge treatment with two corona heads oriented towards each other so that both main faces of the optical lens are almost simultaneously treated.

49. The process of claim 48, wherein the two corona heads are not in register to avoid electric arc between the heads.

50. The process of claim 48, wherein the lens is passed several times in front of each corona head and with a pause between each passage.

51. The process of claim 48, wherein each main face of the optical lens is submitted to the corona discharge for 1 minute or less.

52. The process of claim 1, wherein the treatment (a) is a corona discharge treatment with a single corona head and the lens holder is a rotatable lens holder whereby corona treatment of both main faces of the optical lens is accomplished successively by rotation of 180° of the lens holder.

* * * * *